US008865789B2

(12) United States Patent
Yao et al.

(10) Patent No.: US 8,865,789 B2
(45) Date of Patent: Oct. 21, 2014

(54) SILICONE HYDROGEL CONTACT LENSES

(75) Inventors: Li Yao, San Ramon, CA (US); Ye Hong, Pleasanton, CA (US); Yuwen Liu, Dublin, CA (US); Charlie Chen, San Ramon, CA (US); Charles A. Francis, Union City, CA (US); Arthur Back, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 67 days.

(21) Appl. No.: 13/404,035

(22) Filed: Feb. 24, 2012

(65) Prior Publication Data
US 2012/0220689 A1 Aug. 30, 2012

Related U.S. Application Data

(60) Provisional application No. 61/447,171, filed on Feb. 28, 2011.

(51) Int. Cl.
C08L 101/14 (2006.01)
B65B 55/02 (2006.01)
G02C 7/04 (2006.01)
C08G 77/04 (2006.01)
G02B 1/04 (2006.01)

(52) U.S. Cl.
CPC .................................... *G02B 1/043* (2013.01)
USPC ............................................ 523/107; 53/425

(58) Field of Classification Search
None
See application file for complete search history.

(56) References Cited

U.S. PATENT DOCUMENTS

| 2,393,266 | A |   | 1/1946 | Riddell |   |
|---|---|---|---|---|---|
| 2,989,894 | A |   | 6/1961 | Gordon |   |
| 3,228,741 | A |   | 1/1966 | Becker |   |
| 3,246,941 | A |   | 4/1966 | Moss |   |
| 3,431,046 | A |   | 3/1969 | Conrad et al. |   |
| 3,594,074 | A |   | 7/1971 | Rosen |   |
| 3,907,851 | A |   | 9/1975 | Boersma et al. |   |
| 4,099,859 | A |   | 7/1978 | Merrill |   |
| 4,121,896 | A |   | 10/1978 | Shepherd |   |
| 4,136,250 | A |   | 1/1979 | Mueller et al. |   |
| 4,182,822 | A |   | 1/1980 | Chang |   |
| 4,208,365 | A |   | 6/1980 | LeFevre |   |
| 4,217,038 | A |   | 8/1980 | Letter et al. |   |
| 4,246,389 | A |   | 1/1981 | LeBoeuf |   |
| 4,259,467 | A |   | 3/1981 | Keogh et al. |   |
| 4,260,725 | A | * | 4/1981 | Keogh et al. | 526/279 |
| 4,293,397 | A |   | 10/1981 | Sato et al. |   |
| 4,353,849 | A |   | 10/1982 | Lewison |   |
| 4,401,371 | A |   | 8/1983 | Neefe |   |
| 4,440,918 | A |   | 4/1984 | Rice et al. |   |
| 4,487,905 | A |   | 12/1984 | Mitchell |   |
| 4,605,712 | A |   | 8/1986 | Mueller et al. |   |
| 4,640,594 | A |   | 2/1987 | Berger |   |
| 4,649,184 | A |   | 3/1987 | Yoshikawa et al. |   |
| 4,703,097 | A |   | 10/1987 | Wingler et al. |   |
| 4,711,943 | A | * | 12/1987 | Harvey, III | 526/279 |
| 4,879,072 | A |   | 11/1989 | Bourset et al. |   |
| 4,890,911 | A |   | 1/1990 | Sulc et al. |   |
| 4,954,586 | A |   | 9/1990 | Toyoshima et al. |   |
| 5,009,497 | A |   | 4/1991 | Cohen |   |
| 5,010,141 | A |   | 4/1991 | Mueller |   |
| 5,023,305 | A |   | 6/1991 | Onozuka et al. |   |
| 5,034,461 | A |   | 7/1991 | Lai et al. |   |
| 5,070,169 | A |   | 12/1991 | Robertson et al. |   |
| 5,079,319 | A |   | 1/1992 | Mueller |   |
| 5,104,213 | A |   | 4/1992 | Wolfson |   |
| 5,158,717 | A |   | 10/1992 | Lai |   |
| 5,166,710 | A |   | 11/1992 | Hofer et al. |   |
| 5,258,490 | A |   | 11/1993 | Chang |   |
| 5,260,000 | A |   | 11/1993 | Nandu et al. |   |
| 5,274,008 | A |   | 12/1993 | Lai |   |
| 5,312,690 | A |   | 5/1994 | Fukuda et al. |   |
| 5,314,960 | A |   | 5/1994 | Spinelli et al. |   |
| 5,321,108 | A |   | 6/1994 | Kunzler et al. |   |
| 5,347,326 | A |   | 9/1994 | Volk |   |
| 5,352,714 | A |   | 10/1994 | Lai et al. |   |
| 5,358,995 | A | * | 10/1994 | Lai et al. | 524/542 |
| 5,387,632 | A |   | 2/1995 | Lai et al. |   |
| 5,451,617 | A |   | 9/1995 | Lai et al. |   |

(Continued)

FOREIGN PATENT DOCUMENTS

DE 2546692 4/1977
EP 0330616 A1 8/1989

(Continued)

OTHER PUBLICATIONS

International Preliminary Report on Patentability issued in corresponding International Patent Application No. PCT/US12/26214 mailed Jul. 2, 2013 (20 pages).
International Search Report and Written Opinion issued in corresponding International Patent Application No. PCT/US2012/026214, dated Jun. 8, 2012 (14 pages).
Declaration of Eri Ito dated Mar. 30, 2010 (4 pages).
Suminoe et al., "Study of new non-water containing soft contact lenses, First Report: Basic physical properties of the material," 1983, pp. 100-104 (in Japanese with English translation attached) (18 pages).

(Continued)

*Primary Examiner* — James J Seidleck
*Assistant Examiner* — Peter A Salamon
(74) *Attorney, Agent, or Firm* — Kilyk & Bowersox, P.L.L.C.

(57) ABSTRACT

Silicone hydrogel contact lenses that have good dimensional stability, are ophthalmically-acceptable, and can be manufactured without the use of alcohol solvents are formed from the reaction product of a polymerizable composition comprising at least one mono-functional acrylate-containing siloxane monomer having a molecular weight of less than 2,000; at least one bi-functional acrylate-containing siloxane monomer having a molecular weight of at least 3,000; and at least one hydrophilic vinyl-containing monomer, wherein the polymerizable composition has a molar ratio of total amount of mono-functional acrylate-containing siloxane monomer to total amount of bi-functional acrylate-containing siloxane monomer of at least 30:1, respectively.

24 Claims, No Drawings

(56) References Cited

U.S. PATENT DOCUMENTS

| | | | |
|---|---|---|---|
| 5,483,304 | A | 1/1996 | Porat |
| 5,486,579 | A | 1/1996 | Lai et al. |
| 5,496,871 | A | 3/1996 | Lai et al. |
| 5,539,016 | A | 7/1996 | Kunzler et al. |
| 5,598,233 | A | 1/1997 | Haralambopoulos et al. |
| 5,641,437 | A | 6/1997 | Williams et al. |
| 5,712,327 | A | 1/1998 | Chang et al. |
| 5,760,100 | A | 6/1998 | Nicolson et al. |
| 5,776,999 | A | 7/1998 | Nicolson et al. |
| 5,789,461 | A | 8/1998 | Nicolson et al. |
| 5,807,944 | A | 9/1998 | Hirt et al. |
| 5,817,924 | A | 10/1998 | Tuomela et al. |
| 5,849,811 | A | 12/1998 | Nicolson et al. |
| 5,945,498 | A | 8/1999 | Hopken et al. |
| 5,959,117 | A | 9/1999 | Ozark et al. |
| 5,962,548 | A | 10/1999 | Vanderlaan et al. |
| 5,965,631 | A * | 10/1999 | Nicolson et al. ............... 523/106 |
| 5,969,076 | A | 10/1999 | Lai et al. |
| 5,981,675 | A | 11/1999 | Valint, Jr. et al. |
| 5,998,498 | A * | 12/1999 | Vanderlaan et al. .......... 523/107 |
| 6,020,445 | A | 2/2000 | Vanderlaan et al. |
| 6,043,328 | A | 3/2000 | Domschke et al. |
| 6,310,116 | B1 | 10/2001 | Yasuda et al. |
| 6,359,024 | B2 | 3/2002 | Lai |
| 6,367,929 | B1 | 4/2002 | Maiden et al. |
| 6,436,481 | B1 | 8/2002 | Chabrecek et al. |
| 6,638,991 | B2 | 10/2003 | Baba et al. |
| 6,649,742 | B1 | 11/2003 | Better et al. |
| 6,652,095 | B2 | 11/2003 | Tung |
| 6,689,480 | B2 | 2/2004 | Shimoyama et al. |
| 6,727,336 | B1 | 4/2004 | Ito et al. |
| 6,779,888 | B2 | 8/2004 | Marmo |
| 6,849,671 | B2 | 2/2005 | Steffen et al. |
| 6,861,123 | B2 | 3/2005 | Turner et al. |
| 6,867,245 | B2 | 3/2005 | Iwata et al. |
| 6,886,936 | B2 | 5/2005 | Marmo et al. |
| 6,891,010 | B2 | 5/2005 | Kunzler et al. |
| 6,902,812 | B2 | 6/2005 | Valint, Jr. et al. |
| 6,921,802 | B2 | 7/2005 | Kunzler et al. |
| 6,940,580 | B2 | 9/2005 | Winterton et al. |
| 6,943,203 | B2 | 9/2005 | Vanderlaan et al. |
| 6,951,894 | B1 | 10/2005 | Nicolson et al. |
| 6,992,118 | B2 | 1/2006 | Sulc et al. |
| 7,426,993 | B2 | 9/2008 | Coldrey et al. |
| 7,540,609 | B2 | 6/2009 | Chen et al. |
| 7,572,841 | B2 | 8/2009 | Chen et al. |
| 7,722,808 | B2 | 5/2010 | Matsuzawa et al. |
| 7,934,830 | B2 | 5/2011 | Blackwell et al. |
| 2002/0016383 | A1 | 2/2002 | Iwata et al. |
| 2002/0107324 | A1 | 8/2002 | Vanderlaan et al. |
| 2002/0120084 | A1 | 8/2002 | Valint, Jr. et al. |
| 2002/0137811 | A1 | 9/2002 | Turek et al. |
| 2003/0008154 | A1 | 1/2003 | Aguado et al. |
| 2003/0039748 | A1 | 2/2003 | Valint, Jr. et al. |
| 2003/0095232 | A1 | 5/2003 | Mitsui |
| 2003/0109390 | A1 | 6/2003 | Salpekar et al. |
| 2003/0109637 | A1 | 6/2003 | Kunzler et al. |
| 2003/0125498 | A1 | 7/2003 | McCabe et al. |
| 2003/0134132 | A1 | 7/2003 | Winterton et al. |
| 2003/0162862 | A1 | 8/2003 | McCabe et al. |
| 2004/0039077 | A1 | 2/2004 | Baba et al. |
| 2005/0053642 | A1 | 3/2005 | Ulbricht et al. |
| 2005/0154080 | A1 | 7/2005 | McCabe et al. |
| 2005/0165187 | A1 | 7/2005 | Kunzler et al. |
| 2005/0179862 | A1 | 8/2005 | Steffen et al. |
| 2005/0228065 | A1 | 10/2005 | Nicolson et al. |
| 2006/0001184 | A1 | 1/2006 | Phelan et al. |
| 2006/0007391 | A1 | 1/2006 | McCabe et al. |
| 2006/0012751 | A1 | 1/2006 | Rosenzweig et al. |
| 2006/0063852 | A1 | 3/2006 | Iwata et al. |
| 2006/0072069 | A1 | 4/2006 | Laredo et al. |
| 2006/0074208 | A1 | 4/2006 | Laredo |
| 2007/0066706 | A1 * | 3/2007 | Manesis et al. ............... 523/106 |
| 2007/0231292 | A1 | 10/2007 | Vanderlaan et al. |
| 2007/0291223 | A1 | 12/2007 | Chen et al. |
| 2007/0296914 | A1 * | 12/2007 | Hong et al. ............... 351/160 H |
| 2008/0048350 | A1 | 2/2008 | Chen et al. |
| 2008/0067702 | A1 | 3/2008 | Yao et al. |
| 2009/0018233 | A1 * | 1/2009 | Nunez et al. .................. 523/107 |
| 2009/0234089 | A1 | 9/2009 | Ueyama et al. |
| 2009/0299022 | A1 | 12/2009 | Ichinohe |
| 2010/0084775 | A1 | 4/2010 | McCabe et al. |
| 2011/0009587 | A1 | 1/2011 | Awasthi et al. |

FOREIGN PATENT DOCUMENTS

| | | |
|---|---|---|
| EP | 0330617 A1 | 8/1989 |
| EP | 0908476 A2 | 4/1999 |
| EP | 0908744 A1 | 4/1999 |
| EP | 1870736 A1 | 12/2007 |
| GB | 1399301 | 7/1975 |
| JP | 54-081363 | 5/1979 |
| JP | 63-297411 | 12/1988 |
| JP | 64-084219 | 3/1989 |
| JP | 05-019214 | 1/1993 |
| JP | 06-170857 | 6/1994 |
| JP | 08-025378 | 1/1996 |
| JP | 08-245737 | 9/1996 |
| JP | 08-245790 | 9/1996 |
| JP | 08-304746 | 11/1996 |
| JP | 11-320699 | 11/1999 |
| WO | 91-04283 A1 | 4/1991 |
| WO | 93-05085 A1 | 3/1993 |
| WO | 2009-009527 A1 | 1/2009 |
| WO | 2011-037893 A2 | 3/2011 |
| WO | 2011-041523 A2 | 4/2011 |

OTHER PUBLICATIONS

Communication of a notice of opposition for European Patent Application No. 00981765.1 issued by the European Patent Office dated Jun. 2, 2010 (1 pages).

John Wiley & Sons, Inc., "Polyesters, Films," Encyclopedia of Polymer Science and Engineering, vol. 12, pp. 193-200, 217, and 225-229 (17 pages).

Holden et al., "Critical Oxygen Levels to Avoid Corneal Edema for Daily and Extended Wear Contact Lenses," Investigative Ophthalmology & Visual Science, vol. 25, Oct. 1984, pp. 1161-1167 (7 pages).

Terry et al., "CCLRU Standards for Success of Daily and Extended Wear Contact Lenses," Optometry and Vision Science, vol. 70, No. 3, pp. 234-243 (10 pages).

Jones et al., "Silicone hydrogel contact lenses Part 1 Evolution and current status," www.optometry.co.uk, pp. 26-32, Sep. 20, 2002 (7 pages).

Grant et al., "The Oxygen Transmissibility Profile of Siloxane Hydrogel Contact Lenses," (Poster presentation obtained from the Internet in Oct. 2005. Applicant is unaware of the publication date of the poster, but according to document properties of the electronic poster, it was created and last modified in 2002) (3 pages).

Steffen et al., "Finding the Comfort Zone With the Newest Silicone Hydrogel Technology," Contact Lens Spectrum (obtained from the internet in Oct. 2005; applicant is unaware of the publication date) (5 pages).

Nicolson et al., "Soft contact lens polymers: an evolution," Biomaterials, No. 22, 2001, pp. 3273-3283 (11 pages).

Bausch & Lomb (R) PureVision (TM) Contact Lenses (product information page dated Apr. 21, 1999) (1 page).

"Ciba promotes merits of new 30-night lens," (applicant is unaware of publisher and date of this article) (1 page).

Grobe III, et al. "Surface chemical structure for soft contact lenses as a function of polymer processing," Journal of Biomedical Materials Research, vol. 32, 1996, pp. 45-54 (10 pages).

* cited by examiner

SILICONE HYDROGEL CONTACT LENSES

This application claims the benefit under 35 U.S.C. §119 (e) of prior U.S. Provisional Patent Application No. 61/447,171, filed Feb. 28, 2011, which is incorporated in its entirety by reference herein.

FIELD

The field of the invention relates to silicone hydrogel contact lenses.

BACKGROUND

Contact lenses made from silicone hydrogels are rapidly gaining popularity over contact lenses made from conventional hydrogel materials because, like conventional hydrogel lenses, they are comfortable to wear, but they have the added advantage of having higher oxygen permeability, which is believed to be healthier for the eye. However, contact lenses made from silicone hydrogels often have physical properties that make them more difficult to process during manufacturing and reduces the shelf-life of the final product. New formulations of silicone hydrogel contact lenses that are easier to manufacture and have increased stability are desired.

Some patent documents describing silicone hydrogel contact lenses include U.S. Publ. No. 2007/0296914, U.S. Publ. No. 2007/0066706, U.S. Publ. No. 2007/0231292, U.S. Pat. No. 5,965,631, WO 2011/041523, U.S. Pat. No. 5,358,995, European Publ. No. 1870736A1, U.S. Publ. No. 2006/063852, U.S. Publ. No. 2011/0009587, and U.S. Publ. No. 2009/0234087.

SUMMARY

We have made improved silicone hydrogel contact lenses having good manufacturing processability and shelf-stability. The present disclosure is directed to a silicone hydrogel contact lens comprising a polymeric lens body that is the reaction product of a polymerizable composition comprising a) at least one mono-functional acrylate-containing siloxane monomer having a molecular weight of less than 2,000; b) at least one bi-functional acrylate-containing siloxane monomer having a molecular weight of at least 3,000; and c) at least one hydrophilic vinyl-containing monomer, wherein the polymerizable composition has a molar ratio of total amount of mono-functional acrylate-containing siloxane monomer to total amount of bi-functional acrylate-containing siloxane monomer of at least 30:1, respectively.

In one example, the mono-functional acrylate-containing siloxane monomer can be represented by formula (I),

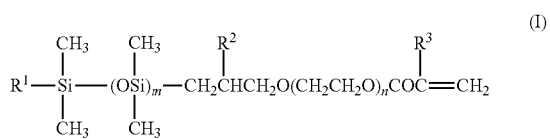

wherein m is an integer from 3 to 10, n is an integer from 0 to 10, $R^1$ is an alkyl group having 1 to 4 carbon atoms, and $R^2$ is hydrogen or methyl group, and $R^3$ is hydrogen or a methyl group.

In one example, the bi-functional acrylate-containing siloxane monomer can be represented by formula (II),

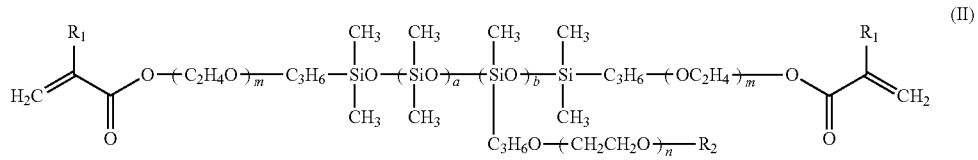

wherein $R_1$ of formula (II) is selected from either hydrogen or a methyl group, $R_2$ of formula (II) is selected from either hydrogen or a $C_{1-4}$ hydrocarbon group, m of formula (II) represents an integer of from 0 to 10; n of formula (II) represents an integer of from 4 to 100, and a and b represent integers of 1 or more.

In one example, the polymerizable composition can have a molar ratio of total amount of mono-functional acrylate-containing siloxane monomer to total amount of bi-functional acrylate-containing siloxane monomer of from about 40:1 to about 200:1.

In one example, the polymerizable composition can have a molar ratio of total amount of hydrophilic vinyl-containing monomer to total amount of acrylate-containing siloxane monomer of about 5:1 to about 20:1.

In one example, the at least one hydrophilic vinyl-containing monomer can be selected from N-vinyl-N-methyl acetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof.

In one example, the polymerizable composition can further comprise at least one vinyl-containing cross-linking agent. In such example, the at least one vinyl-containing cross-linking agent can be selected from divinyl ether, or divinyl sulfone, or triallyl phthalate, or triallyl isocyanurate, or diallyl phthalate, or diethyleneglycol divinyl ether, or triethyleneglycol divinyl ether, or any combination thereof.

In one example, the polymerizable composition can further comprises at least one non-siloxane acrylate-containing monomer. In such example, the at least one non-siloxane acrylate-containing monomer can be selected from methyl methacrylate (MMA), or 2-hydroxybutyl methacrylate (HOB), or tert butyl methacrylate (tBMA), or N,N-dimethylacrylamide (DMA), or 2-hydroxyethyl methacrylate (HEMA), or ethoxyethyl methacrylamide (EOEMA), or ethylene glycol methyl ether methacrylate (EGMA), or isobornyl methacrylate (IBM), or any combination thereof.

In one example, the polymerizable composition may have a molar ratio of total amount of mono-functional acrylate-containing siloxane monomer and total amount of non-siloxane acrylate-containing monomer, combined, to total amount of bi-functional acrylate-containing siloxane monomer of at least about 100:1, respectively.

In one example, the polymerizable composition can further comprise at least one acrylate-containing cross-linking agent. In one such example, the at least one acrylate-containing cross-linking agent can be selected from triethylene glycol dimethacrylate, or ethylene glycol dimethacrylate, or a combination thereof.

Another aspect of the present disclosure is a method of manufacturing a silicone hydrogel contact lens, said method comprising a) preparing a polymerizable composition comprising at least one mono-functional acrylate-containing siloxane monomer having a molecular weight of less than 2,000, at least one bi-functional acrylate-containing siloxane monomer having a molecular weight of at least 3,000, and at least one hydrophilic vinyl-containing monomer, wherein the polymerizable composition has a molar ratio of total amount of mono-functional acrylate-containing siloxane monomer to total amount of bi-functional acrylate-containing siloxane monomer of at least 30:1, respectively; b) polymerizing the polymerizable composition to form a polymeric lens body; c) contacting the polymeric lens body with a washing liquid to remove unreacted or partially reacted components from the polymeric lens body; d) sealing the washed polymeric lens body in a package comprising a packaging solution; and e) sterilizing the sealed package. In a specific example, the washing liquid and any other liquid used for washing the polymeric lens body are substantially free of volatile organic solvents.

DETAILED DESCRIPTION

Silicone hydrogel contact lenses are described herein that have good dimensional stability, are ophthalmically-acceptable, and can be manufactured without the use of volatile organic solvents. The silicone hydrogel contact lenses comprise a polymeric lens body that is the reaction product of a polymerizable composition comprising a) at least one mono-functional acrylate-containing siloxane monomer having a molecular weight of less than 2,000; b) at least one bi-functional acrylate-containing siloxane monomer having a molecular weight of at least 3,000; and c) at least one hydrophilic vinyl-containing monomer, wherein the polymerizable composition has a molar ratio of total amount of mono-functional acrylate-containing siloxane monomer to total amount of bi-functional acrylate-containing siloxane monomer of at least 30:1, respectively. References herein to 'at least one' of a type of ingredient refer to both a) a single ingredient, and b) a combination of two or more ingredients of the same type. References herein to 'a total amount' of a particular component (i.e. a combination of two or more ingredients of the same type) in a polymerizable composition refer to the sum of the amounts of all ingredients of the same type.

The following definitions for the quoted terms provided below are applicable herein unless context dictates otherwise:

A "monomer" refers to any molecule capable of reacting with other molecules that are the same or different, to form a polymer or copolymer. Thus, the term encompasses polymerizable pre-polymers and macromers, there being no size-constraint of the monomer unless indicated otherwise.

A "siloxane monomer" contains at least one Si—O group, and is typically either "mono-functional" or "multi-functional", meaning that it has either one polymerizable group or two or more polymerizable groups, respectively. A "non-siloxane monomer" is a monomer that does not contain any Si—O groups.

An "acrylate-containing monomer" is any non-siloxane monomer that has a single polymerizable acrylate group (e.g. methyl methacrylate, acrylamide, etc.). A siloxane monomer having at least one polymerizable acrylate group is referred to herein as an "acrylate-containing siloxane monomer".

A "vinyl-containing monomer" is any non-siloxane monomer that has a single polymerizable carbon-carbon double bond (i.e., a vinyl group) present in its molecular structure, where the carbon-carbon double bond of the vinyl group is less reactive than the carbon-carbon double bond present in an acrylate or a methacrylate polymerizable group under free radical polymerization. Thus, while a carbon-carbon double bond is present in acrylate groups and methacrylate groups, as used herein, monomers comprising a single acrylate or methacrylate polymerizable group are not considered to be vinyl-containing monomers.

A monomer is considered "hydrophilic" if at least 50 grams of the monomer are fully soluble in 1 liter of water at 20° C. (i.e., ≥5% soluble in water) as determined visibly using a standard shake flask method.

A "polymerizable composition" is a composition comprising polymerizable ingredients, where the composition has not yet been subjected to conditions that result in polymerization of the polymerizable ingredients.

In one example, the mono-functional acrylate-containing siloxane monomer can have a molecular weight of less than 2,000, 1,500, 1,000, or 750, and the bi-functional acrylate-containing siloxane monomer can have a molecular weight of at least 3,000, 3,500, 4,000, 4,500, 5,000, 6,000, 7,000, or 8,000. In the case of polyorganosiloxane prepolymers, and other polydisperse monomers, the term "molecular weight" as used herein, refers to the absolute number average molecular weight (in units of Daltons) of the monomer as determined by $^1$H NMR end-group analysis. In a further specific example, the mono-functional acrylate-containing siloxane monomer may have a molecular weight of from about 500 to about 1000, and the bi-functional acrylate-containing siloxane monomer may have a molecular weight of from about 5,000 to about 12,000. Throughout this disclosure a reference to "an example" or "a specific example" or similar phrase, is intended to introduce a feature or features of the contact lens, polymerizable composition, or method of manufacture (depending on context) that can be combined with any combination of previously-described or subsequently-described examples (i.e. features), unless a particular combination of features is mutually exclusive, or if context indicates otherwise.

Examples of mono-functional acrylate-containing siloxane monomers that can be used in the polymerizable composition include 3-[tris(trimethylsiloxy)silyl]propyl methacrylate ("TRIS"), 3-methacryloxy-2-hydroxypropyloxy)propylbis(trimethylsiloxy)methylsilane ("SiGMA"), methyldi(trimethylsiloxy)sylylpropylglycerolethyl methacrylate ("SiGEMA"), and monomethacryloxypropyl functional polydimethylsiloxanes such as MCR-M07 and MCS-M11, all available from Gelest (Morrisville, Pa., USA). Additional suitable mono-functional siloxane monomers are known in the field (see e.g. U.S. Pat. No. 7,572,841, U.S. Pat. No. 5,998,498, U.S. Pat. No. 5,965,631, U.S. Pub. No. 2006/0063852, U.S. Pub. No. 2007/0296914, and U.S. Pat. No. 6,867,245, each incorporated herein by reference). In one example, the mono-functional siloxane monomer is represented by formula (I),

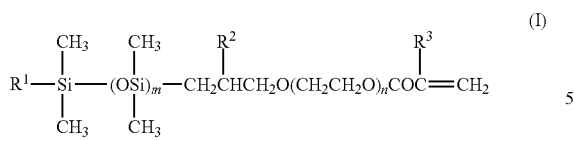

(I)

where m is an integer from 3 to 10, n is an integer from 0 to 10, $R^1$ is an alkyl group having 1 to 4 carbon atoms, $R^2$ is hydrogen or a methyl group, and $R^3$ is hydrogen or a methyl group. In a specific example, the mono-functional siloxane monomer is represented by formula I wherein $R^1$ is a butyl group, $R^2$ is hydrogen, $R^3$ is a methyl group, m is 4, and n is 1. This particular siloxane monomer is designated "Si-1" in the Examples section below. Methods of making siloxane monomers represented by formula (I) are described in U.S. Publ. no. 20090299022, incorporated herein by reference.

In one example, the mono-functional acrylate-containing siloxane monomer can be represented by formula (III),

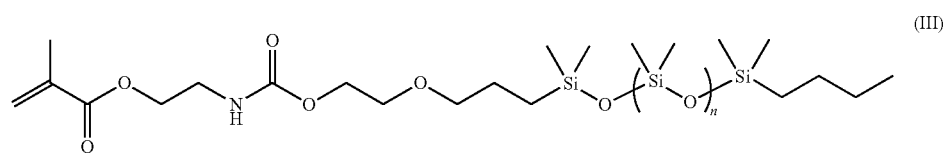

(III)

where n is an integer from about 10 to 15. Siloxane monomers of formula III and other suitable monomers are described in U.S. Pat. No. 6,310,169, incorporated herein by reference.

Suitable bi-functional acrylate-containing siloxane monomers that can be used in the polymerizable composition are known in the field (see e.g. U.S. Pat. No. 7,572,841, U.S. Publ no. 2007/0296914 and U.S. Publ. no. 2006/0063852, each incorporated herein by reference. In one example, the bi-functional acrylate-containing siloxane monomer can be represented by formula (II):

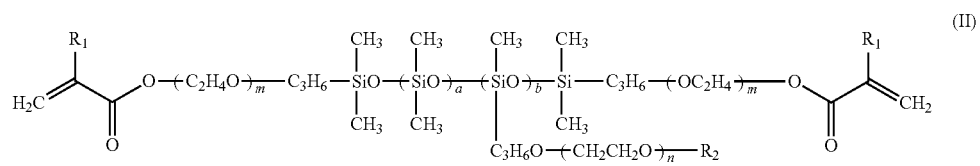

(II)

wherein $R_1$ is selected from either hydrogen or a methyl group; $R_2$ is selected from either hydrogen or a $C_{1-4}$ hydrocarbon group; m represents an integer of from 0 to 10; n represents an integer of from 4 to 100; a and b represent integers of 1 or more; a+b is equal to 20-500; b/(a+) is equal to 0.01-0.22; and the configuration of siloxane units includes a random configuration. In a more specific example, the bi-functional acrylate-containing siloxane monomer can be represented by formula II wherein $R_1$ and $R_2$ are methyl groups, m is 0, n represents an integer from about 5 to about 10, a represents an integer of from about 70 to about 90, and b represent an integer of from 1 to about 10; this siloxane monomer is designated "Si-2" in the Examples section below and has a molecular weight of about 8,000 to about 10,000. Methods of making compounds of formula II are described in U.S. Publication no. 2009/0234089, incorporated herein by reference.

In one example, the bi-functional acrylate-containing siloxane monomer can be represented by formula (IV),

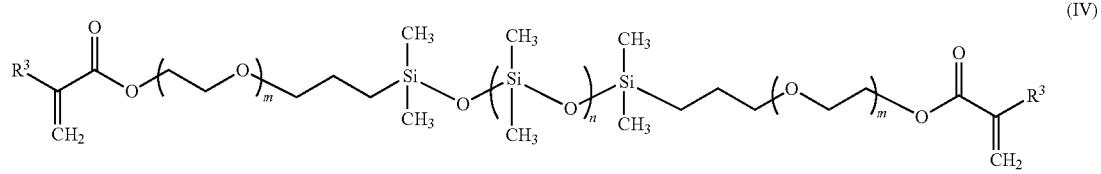

wherein $R^3$ is selected from either hydrogen or a methyl group, m represents an integer from 0 to 10, and n represents an integer from 1 to 500. In a specific example, the bi-functional acrylate-containing siloxane monomer is a methacryloxypropyl-terminated polydimethylsiloxane represented by formula III where $R^3$ is a methyl group, m is 0, and n is an integer from 40 to 60. This monomer is available from Gelest (Morrisville, Pa., USA) and is referred to as "DMS-R18" from the manufacturer and as "Si-3" in the Examples below. Additional suitable methacryloxypropyl-terminated polydimethylsiloxanes include DMS-R22 and DMS-R31, also available from Gelest.

In another example, the bi-functional acrylate-containing siloxane monomer can be represented by formula (V),

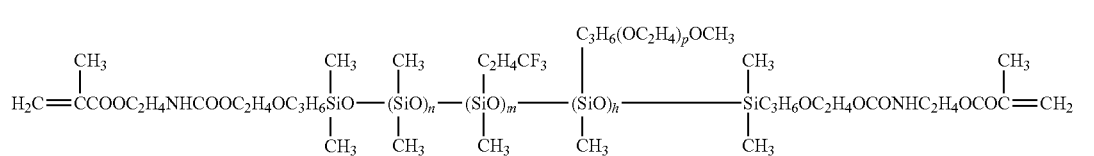

wherein n is an integer of about 100 to 150, m and p are both integers of about 5 to 10, and h is an integer of about 2 to 8. Methods of making compounds of formula IV are described in U.S. Pat. No. 6,867,245, incorporated herein by reference.

In one example, the polymerizable composition can have a molar ratio of total amount of mono-functional acrylate-containing siloxane monomer to total amount of bi-functional acrylate-containing siloxane monomer of from about 20:1, 30:1, 40:1, 50:1, 75:1 or 100:1, to about 150:1, 175:1, 200:1, 225:1 or 250:1. In a specific example, the polymerizable composition can have a molar ratio of total amount of mono-functional acrylate-containing siloxane monomer to total amount of bi-functional acrylate-containing siloxane monomer of from about 30:1 to about 150:1, wherein the mono-functional acrylate-containing siloxane monomer has a molecular weight of from about 500 to about 1000, and the bi-functional acrylate-containing siloxane monomer has a molecular weight of from about 5,000 to about 12,000. Throughout this disclosure, when a series of lower limit ranges and a series of upper limit ranges are provided, all combinations of the provided ranges are contemplated as if each combination were specifically listed. For example, in the above listing of molar ratios, all 30 possible ranges of molar ratios are contemplated (i.e. 20:1 to 150:1, 20:1 to 175:1 . . . 100:1 to 225:1, and 100:1 to 250:1). Also, throughout this disclosure, when a series of values is presented with a qualifier preceding the first value, the qualifier is intended to implicitly precede each value in the series unless context dictates otherwise. For example, for the values listed above, it is intended that the qualifier "from about" implicitly precedes each of the ratios of 30:1, 40:1, 50:1, 75:1, and 100:1, and that the qualifier "to about" implicitly precedes each of the ratios of 175:1, 200:1, 225:1, and 250:1.

In various examples where more than one hydrophilic vinyl-containing monomer is included in the polymerizable composition, at least 50%, 60%, 70% or 80% by weight of the total amount of hydrophilic vinyl-containing monomer has a solubility in water of ≥10%, 15% or 20%. In a specific example, 100% of the total amount of hydrophilic vinyl-containing monomer in the polymerizable composition has a solubility in water of ≥10%, 15%, or 20%. The hydrophilic vinyl-containing monomer typically has a molecular weight of about 75 to about 500, and more typically about 75 to 250.

Examples of hydrophilic vinyl-containing monomers that can be used in the polymerizable formulations described herein include hydrophilic monomers having a single vinyl ether, or vinyl ester, or allyl ester, or vinyl amide polymerizable group. Exemplary hydrophilic vinyl-containing monomers include N-vinyl-N-methyl acetamide (VMA), N-vinyl pyrrolidone (NVP), N-vinyl formamide, N-vinyl acetamide, N-vinyl-N-ethyl acetamide, N-vinyl isopropylamide, N-vinyl caprolactam, N-vinyl-N-ethyl formamide, 1,4-butanediol vinyl ether (BVE), ethylene glycol vinyl ether (EGVE), diethylene glycol vinyl ether (DEGVE), a poly(ethylene glycol) vinyl ether having from 4 to 10 ethylene glycol units, a poly(ethylene glycol) vinyl ether having more than 10 ethylene glycol units, or any combination thereof. Other suitable hydrophilic vinyl-containing monomers that can be used in the polymerizable compositions are described, for example, in the patent publications referenced in the Background section above, which are incorporated herein by reference in their entireties. In a specific example, the hydrophilic vinyl-containing monomer can have a molecular weight of about 75 to about 200. In a further specific example the polymerizable composition has a molar ratio of total amount of hydrophilic vinyl-containing monomer to total amount of acrylate-containing siloxane monomer (i.e. the mono- and bi-functional acrylate-containing siloxane monomers) of from about 5:1, 6:1, or 7:1 to about 15:1, 18:1, or 20:1, respectively. Throughout this disclosure, references to 'a total amount' of a particular component (i.e. a combination of two or more ingredients of the same type) in a polymerizable composition refer to the sum of the amounts of all ingredients of the same type.

The polymerizable composition may additionally comprise at least one cross-linking agent. As used herein, a "cross-linking agent" is any compound having a molecular weight of less than about 2,000 with two or more ethylenically unsaturated groups. Thus, a cross-linking agent can react with functional groups on two or more polymer chains so as to bridge one polymer to another. The cross-linking agent may be an acrylate-containing cross-linking agent, a vinyl-containing cross-linking agent, or a mixed cross-linking agent. An "acrylate-containing cross-linking agent" has at least two polymerizable acrylate groups, and no other type of polymerizable functional group. A "vinyl-containing cross-linking agent" has at least two polymerizable vinyl groups, and no other type of polymerizable functional group, where the carbon-carbon double bond of the vinyl group is less reactive than the carbon-carbon double bond present in an acrylate or a methacrylate polymerizable group under free radical polymerization. A mixed cross-linking agent contains at least one polymerizable acrylate group and at least one polymerizable vinyl group. In some examples, the cross-linking agent has a molecular weight of less than 1500, 1000, 500, or 250. In certain examples the cross-linking agent is free of siloxane moieties, i.e. it is a non-siloxane cross-linking agent. A variety of cross-linking agents suitable for use in silicone hydrogel polymerizable compositions are known in the field (see e.g. U.S. Publication no. 2007/0296914, incorporated herein by reference). Examples of cross-linking agents that can be used in the polymerizable compositions disclosed herein, include, without limitation, lower alkylene glycol di(meth) acrylates such as triethylene glycol dimethacrylate and diethylene glycol dimethacrylate; poly(lower alkylene) glycol di(meth)acrylates; lower alkylene di(meth)acrylates; divinyl ethers such as triethyleneglycol divinyl ether, diethyleneglycol divinyl ether, 1,4-butanediol divinyl ether and 1,4-cyclohexanedimethanol divinyl ether; divinyl sulfone; di- and trivinylbenzene; trimethylolpropane tri(meth)acrylate; pentaerythritol tetra(meth)acrylate; bisphenol A di(meth) acrylate; methylenebis(meth)acrylamide; triallyl phthalate; 1,3-Bis(3-methacryloxypropyl)tetramethyldisiloxane; diallyl phthalate; and combinations thereof.

In one example, the polymerizable composition may comprise both an acrylate-containing cross-linking agent and a vinyl-containing cross-linking agent. The use of an acrylate-containing cross-linking agent in combination with a vinyl-containing cross-linking agent in a polymerizable composition comprising a hydrophilic vinyl-containing monomer together with the mono-functional and bi-functional acrylate-containing siloxane monomers has been found to result in lenses having good dimensional stability, desirable modulus, and excellent wettability. In one such example, the polymerizable composition may have a molar ratio of total amount of acrylate-containing cross-linking agent to total amount of vinyl-containing cross-linking agent of at least about 3:2, 2:1, 3:1, or 4:1, and optionally up to about 16:1, 14:1, 12:1, or 10:1, respectively. In a specific example, the vinyl-containing cross-linking agent is a divinyl ether such as triethyleneglycol divinyl ether (TEGDVE) or diethyleneglycol divinyl ether (DEGDVE), and the acrylate-containing cross-linking agent is a lower alkylene glycol dimethacrylate such as triethylene glycol dimethacrylate (TEGDMA) or ethylene glycol dimethacrylate (EDGMA). In other examples, there is no added acrylate-containing cross-linking agent, and all of the acrylate-containing cross-linking is due to the presence of the bi-functional acrylate-containing siloxane monomer.

In yet another example, the polymerizable composition has a molar ratio of total amount of acrylate-containing cross-linking agent to total amount of bi-functional acrylate-containing siloxane monomer at least about 3:2, 2:1, 3:1, or 4:1, and optionally up to about 16:1, 14:1, 12:1, or 10:1, respectively.

In one example, the polymerizable composition may further comprise a non-siloxane acrylate-containing monomer to further enhance mechanical strength and/or stiffness of the lens, or confer other desired properties. In a specific example, the non-siloxane acrylate-containing monomer has a polymerizable methacrylate group. Numerous suitable non-siloxane acrylate-containing monomers are known in the field. Exemplary acrylate-containing monomers include methyl methacrylate (MMA), 2-hydroxybutyl methacrylate (HOB), tert butyl methacrylate (tBMA), N,N-dimethylacrylamide (DMA), 2-hydroxyethyl methacrylate (HEMA), ethoxyethyl methacrylamide (EDEMA), ethylene glycol methyl ether methacrylate (EGMA), isobornyl methacrylate (IBM), and combinations thereof. In a specific example, the polymerizable composition may have a molar ratio of total amount of non-siloxane acrylate-containing monomer and total amount of mono-functional acrylate-containing siloxane monomer, collectively, to total amount of bi-functional acrylate-containing siloxane monomer of from about 100:1, 150:1, 200:1, 250:1, or 300:1 to about 500:1, 550:1, 600:1, 650:1, 700:1, or 750:1.

The polymerizable compositions can also be described in terms of the percentage by weight (wt. %) of each reactive component in the polymerizable composition, and wt. % ratios of various reactive components, wherein the weight percentages are based on total weight of reactive components of the composition relative to the total weight of all reactive components. For example, the polymerizable composition may have a wt. % ratio of total amount of mono-functional acrylate-containing siloxane monomer having a molecular weight of less than 2,000, to total amount of bi-functional acrylate-containing siloxane monomer having a molecular weight of at least 3,000, of at least 2:1, respectively. In another example, the polymerizable composition may have a total amount of acrylate-containing siloxane monomers (i.e. mono-functional and bi-functional acrylate-containing siloxane monomers combined) of from about 20 or 30 wt. % to about 50 or 60 wt. %. Throughout this disclosure, when a series of values is presented with a unit of measurement following the last value of the series, the unit of measurement is intended to implicitly follow each preceding value in the series unless context indicates otherwise. For example, in the above listing of weight percent ranges for the total amount of acrylate-containing siloxane monomer, it is intended that the unit of measurement "wt. %" implicitly follows the values of 20 and 50. In another example, the polymerizable composition may have a total amount of mono-functional acrylate-containing siloxane monomer of from about 20 to about 40 wt. %, and a total amount of bi-functional acrylate-containing siloxane monomer of from about 5 to about 15 wt. %. In another example, the polymerizable composition may have a total amount of hydrophilic vinyl-containing monomer of from about 30 or 40 wt. % to about 50 or 60 wt. %; a total amount of acrylate-containing cross-linking agent of from about 0.05 to about 4 wt. %; and a total amount of vinyl-containing cross-linking agent of from about 0.02 or 0.05 wt. % to about 0.5 or 1.0 wt. %. In a specific example, the polymerizable composition may have a total amount of non-siloxane acrylate-containing monomer of from about 10, or 15 wt. % to about 20, 25, or 30 wt. %. In a further specific example, the polymerizable composition may have a total amount of mono-functional acrylate-containing siloxane monomer having a molecular weight of about 250 to 1,000, of from about 20 wt. % to about 35 wt. %; a total amount of bi-functional acrylate-containing siloxane monomer having a molecular weight of from about 5,000 to 12,000, of from about 5 wt. % to about 10 wt. %; a total amount of hydrophilic vinyl-containing monomer of from about 40 wt. % to about 50 wt. %; a total amount of a vinyl-containing cross-linking agent of from about 0.02 wt. % to about 1 wt. %; and optionally, a total amount of an acrylate-containing cross-linking agent of from about 0.05 wt. % to about 2 wt. %, wherein the polymerizable composition has a molar ratio of total amount of mono-functional acrylate-containing siloxane monomer to total amount of bi-functional acrylate-containing siloxane monomer of from about 30:1 to about 150:1, respectively.

The polymerizable compositions can also be described in terms of the molar percentages (mol. %) of each reactive component in the composition, wherein the molar percentages are based on the total moles of reactive components of the composition. For example, in one embodiment, the polymerizable composition may comprise a mono-functional acrylate-containing siloxane monomer having a molecular weight of less than 2,000, and a bi-functional acrylate-containing siloxane monomer having a molecular weight of at least 3,000, wherein the polymerizable composition has a total amount of acrylate-containing siloxane monomers of from about 2.0, 3.0, 4.0, 5.0, or 6.0 mol. % to about 8.0, 10.0, 12.0, or 15.0 mol. %. In a specific example, the polymerizable composition may have a total amount of bi-functional acrylate-containing siloxane monomer of from about 0.04, 0.06, 0.08, or 0.10 mol. % to about 0.20, 0.25, 0.30, or 0.35 mol. %, and a total amount of mono-functional acrylate-containing siloxane monomer of from about 2.0, 3.0, 4.0 or 5.0 mol. % to about 8.0, 10.0, 12.0, or 15.0 mol. %. In each of the foregoing examples, the polymerizable composition may optionally have a total amount of hydrophilic vinyl-containing monomer of from about 50, 55, 60 or 65 mol. % to about 75, 80, or 85 mol. %. In another specific example, the polymerizable composition may further have a total amount of non-siloxane acrylate-containing monomer of from about 12, 14, 16, or 18 mol. % to about 20, 25, or 30 mol. %. Further, the polymerizable composition may have a total amount of acrylate-containing cross-linking agent of from about 0.20, 0.25, 0.30, or 0.35 mol. % to about 0.50, 0.60, 0.70, 0.80, or 1.0 mol. %. In yet another example, the polymerizable composition may have a total amount of vinyl-containing cross-linking agent of from about 0.02, 0.04, or 0.06 mol. % to about 0.10, 0.15 or 0.20 mol. In a further example, the polymerizable composition has a total amount cross-linking components (i.e. the sum of all reactive ingredients having two or more polymerizable functional group a) of about 0.2, 0.4, or 0.6 mol. % to about 0.8, 1.0, 1.2, or 1.4 mol. %.

Polymerizable compositions described herein result in contact lenses that have ophthalmically acceptably wettable lens surfaces without the inclusion of a high molecular weight hydrophilic polymer (i.e. a preformed polymer) in the polymerizable composition. In a particular example, the polymerizable composition is substantially free of a hydrophilic polymer. As used herein, "substantially free" means none or an inconsequential amount, i.e. an amount that has no measurable affect on the physical properties of the lens. However, such hydrophilic polymers may be included in the polymerizable composition, if desired. Examples of such hydrophilic polymers include polyamides, polylactams (especially polyvinylpyrrolidone), polyimides, polylactones, and polydextrans, having molecular weights of at least 50,000, and are described in U.S. Pat. No. 6,367,929, incorporated herein by reference. Accordingly, in another example the polymerizable composition additionally comprises a hydrophilic polymer in an amount that increases the wettability of the contact lens relative to a contact lens that lacks the hydrophilic polymer but is otherwise identical.

As will be appreciated by those skilled in the art, the polymerizable composition will typically comprise non-polymerizable ingredients, in addition to the polymerizable ingredients, that are conventionally used in contact lens formulations. For example, the polymerizable composition will typically include a polymerization initiator, a UV absorbing agent, and a tinting agent. Additional ingredients may also be included such as an organic diluent, an oxygen scavenger, or a chain transfer agent. Non-limiting examples of these and additional ingredients that may be included in the polymerizable composition are provided in U.S. Publication no. 2007/0296914, and below.

Contact lenses can be made from the polymerizable compositions described herein using curing and other processing methods known in the field, such as cast molding, spin casting, injection molding, forming a polymerized rod that is subsequently lathed, etc. In a specific example, the polymerizable composition is cast molded between molds formed of a thermoplastic polymer. The thermoplastic polymer is typically a non-polar material, such as polypropylene, but polar mold materials are also used in the field. Briefly, a first mold member defining the front surface of the contact lens, referred to as a "female mold member", is filled with an amount of the polymerizable composition sufficient to form a single polymeric lens body. A second mold member defining the back (i.e. eye-contacting) surface of the contact lens, referred to as the "male mold member", is coupled to the female mold member to form a mold assembly having a lens-shaped cavity with the amount of polymerizable composition therebetween.

The polymerizable composition within the contact lens mold assembly is polymerized using any suitable curing method. Typically, the polymerizable composition is exposed to polymerizing amounts of heat or ultraviolet light (UV). In the case of UV-curing, also referred to as photopolymerization, the polymerizable composition typically comprises a photoinitiator such as benzoin methyl ether, 1-hydroxycyclohexylphenyl ketone, Darocur or Irgacur (available from Ciba Specialty Chemicals). Photopolymerization methods for contact lenses are described in U.S. Pat. No. 5,760,100. In the case of heat-curing, also referred to as thermal curing, the polymerizable composition typically comprises a thermal initiator. Exemplary thermal initiators include 2,2'-azobis(2,4-dimethylpentanenitrile) (VAZO-52), 2,2'-Azobis(2-methylpropanenitrile) (VAZO-64), and 1,1'-azo bis(cyanocyclohexane) (VAZO-88). In an exemplary thermal curing method that can be used to polymerize polymerizable compositions described herein, the mold assemblies are subjected to a first curing temperature of from about 50 to 65° C., which is maintained for about 15 to 45 minutes, and then the temperature is increased to a second temperature of at least about 70° C. In one such example, the second curing temperature can be from about 70 to 85° C. and can be maintained for about 15 to 45 minutes, then the temperature can be increased again to at least about 90° C., and can be maintained until polymerization is substantially complete, typically at least about 15 minutes. Additional thermal polymerization methods for contact lenses are described in US Publ. no. 2007/0296914 and U.S. Pat. No. 7,854,866, incorporated herein by reference.

At the completion of curing, the polymerized material between the mold members of the mold assembly has the shape of a contact lens, and is referred to herein as a "polymeric lens body". The male and female mold members are demolded, i.e. separated, and the polymeric lens body is removed, i.e. delensed, from the mold member to which it is adhered. These processes are referred to as demolding and delensing, respectively, and a variety of such methods are known to those of ordinary skill in the field. In some methods, the demolding and delensing processes can comprise a single process step, such as when the molds are separated using a liquid which also removes the polymeric lens body from the mold. In other methods, such as when a dry-demolding process is used, the polymeric lens body typically remains on one of the mold members and is delensed in a subsequent process step. Delensing can also be a wet or dry process. In one example, delensing is carried out by a "float off" method in which the mold member to which a polymeric lens body is adhered is immersed in water. The water may optionally be heated (e.g. up to about 100° C.). Typically, the polymeric lens bodies float off of the mold members in about ten minutes. Dry delensing can be carried out manually, for example using tweezers to remove the polymeric lens bodies from the mold member, or they can be removed using an automated mechanical process, such as described in U.S. Pat. No. 7,811,483. Additional demolding and delensing methods for silicone hydrogel contact lenses are described in US Publ No. 2007/0035049.

After delensing, the polymeric lens body is washed to remove unreacted or partially reacted ingredients from the polymeric lens body and to hydrate the polymeric lens body. In a specific example, the polymeric lens body is washed in a washing liquid free of volatile organic solvents (e.g. methanol, ethanol, chloroform, etc.), and all liquids used to wash the polymeric lens body are free of volatile organic solvents. This type of washing may also be referred to herein as "organic solvent-free extraction" where "organic solvent" refers to volatile organic solvents. For example, a washing step that uses aqueous solutions of surfactants such as Tween 80, without any volatile organic solvents, is considered to be a volatile organic solvent-free extraction. In a further example, the polymeric lens body is not contacted by any volatile organic solvents during the manufacturing process (i.e. from the time curing of the polymeric lens body is complete until the time it is sealed in its final packaging). While the polymerizable compositions described herein can be used to make polymeric lenses bodies that can be washed without the use of volatile organic solvents, if desired, they can also be washed with organic solvents. Thus, washing steps can include contacting the polymeric lens body with a volatile organic solvent, such as a lower alcohol (e.g. methanol, ethanol, etc.), contacting the polymeric lens body with aqueous liquids that may or may not contain a volatile organic solvents, solutes, or combinations thereof. Exemplary washing methods are described in US Pat Publ no. 2007/0296914 and in Example 1 below.

The good wettability of the contact lenses achieved from the polymerizable compositions described herein avoids the need for post-polymerization surface modification of the polymeric lens body to impart wettability. One example of a post-polymerization surface modification used to impart wettability is surface plasma treatment (see e.g. U.S. Pat. No. 4,143,949). Another example of a post-polymerization modification to impart wettability is the coating of hydrophilic polymers onto the surface of the polymeric lens body such as by a layer-by-layer technique (see e.g. U.S. Pat. No. 7,582,327), or by the addition of a hydrophilic polymer into the packaging solution (see e.g. U.S. Pat. No. 7,841,716). Accordingly, in a specific example, the method of making the contact lens is free of a post-polymerization surface modification. For example, the method may not include a plasma surface modification of the polymeric lens body and/or a hydrophilic polymer may not be coated onto the polymeric lens body and/or a hydrophilic polymer may not be added to the packaging solution that is placed into the contact lens package.

After washing, and any optional surface modifications, the hydrated polymeric lens body is typically placed into a blister package, glass vial, or other appropriate container, all referred to herein as "packages." A packaging solution is also added to the container, which is typically a buffered saline solution such as phosphate- or borate-buffered saline. The packaging solution may optionally contain additional ingredients such as a comfort agent, a hydrophilic polymer, a surfactant or other additive that prevents the lens from sticking to the container, etc. The package is sealed, and the sealed polymeric lens body is sterilized by sterilizing amounts of radiation, including heat or steam, such as by autoclaving, gamma radiation, e-beam radiation, ultraviolet radiation, etc. The final product is a sterile, packaged ophthalmically-acceptable contact lens.

Typically, contact lenses that have been processed using organic solvent-free extraction will have a "wet extractable component". In specific examples, the wet extractable component of the final contact lens product constitutes about 2 to about 8% of the dry weight of the lens, and usually about 3 to about 6% of the dry weight of the lens. The percentage of the wet extractable component in a contact lens is determined using a Sohxlet extraction process as follows: Five fully-hydrated, sterilized contact lenses from a single lot are removed from their packages and excess packaging solution is removed from the lenses with a paper towel. The lenses are dried overnight in an 80° C. vacuum oven, then each dried lens is weighed to get the dry weight of the lens ($W1$). Each lens is then placed in a perforated, stackable Teflon thimble, and the thimbles are stacked to form an extraction column with an empty thimble placed at the top of the column. The extraction column is placed into a small Sohxlet extractor (VWR 80068-164) and the extractor is attached to a condenser (VWR 80068-1580) and a 125 ml round bottom flask (VWR-80068-704) containing about 70-80 ml methanol. Water is circulated around the condenser and the methanol is heated until it gently bubbles. The lenses are extracted for 4 hours from the time condensed methanol first begins to drop. The methanol-extracted lenses are removed from the thimbles and dried overnight at 80° C. in a vacuum oven. Each lens is weighed to obtain the dry weight of the extracted lens ($W2$), and the following calculation is made for each lens: $[(W1-W2)/W1]*100$. The average of the five values is taken to be the percentage of wet extractable for each lens of the lot of lenses tested.

The contact lenses described herein are "ophthalmically-acceptable" meaning that the lenses have ophthalmically acceptably wettable lens surfaces and ionoflux values such that the lenses typically do not cause or are not associated with significant corneal swelling, corneal dehydration ("dry eye"), superior epithelial arcuate lesions ("SEALs"), or other significant discomfort. Determining whether a contact lens is ophthalmically acceptable can be achieved using conventional clinical methods, such as those performed by an eye care practitioner, and as understood by persons of ordinary skill in the art.

In any of the above-described examples, the contact lens may be characterized by one or more of the following properties: ionoflux, contact angle, oxygen permeability, tensile modulus, equilibrium water content, and % energy loss, as detailed in the following seven paragraphs.

In any of the above-described examples, the contact lens may have an ionoflux of less than about $10\times10^{-3}$ mm$^2$/min, $9\times10^{-3}$ mm$^2$/min, $8\times10^{-3}$ mm$^2$/min, $7\times10^{-3}$ mm$^2$/min, $6 \times 10^{-3}$ mm²/min, $5 \times 10^{-3}$ mm²/min, or $4 \times 10^{-3}$ mm²/min as measured using the "Ionoflux Technique" described in U.S. Pat. No. 5,849,811, incorporated by reference herein, or an equivalent method such as the following method that was used to determine the ionoflux values provided in the Examples below. A hydrated lens is placed in 40 ml deionized water for 10 minutes. The lens is then placed in a lens-retaining device, between male and female portions. The male and female portions include flexible sealing rings which are positioned between the lens and the respective male or female portion. The lens-retaining device is then placed in a threaded lid. The lid is screwed onto a glass tube to define a donor chamber. The donor chamber is filled with 16 ml of 0.1 molar NaCl solution. A 100 ml beaker, used as a receiving chamber, is filled with 80 ml of deionized water. Leads of a conductivity meter and a stir bar are immersed in the deionized water of the receiving chamber. The receiving chamber is placed in a 250 ml beaker jacket that was filled with about 50 ml deionized water and connected to a water bath with temperature control set to achieve a temperature of about 35° C. in the receiving chamber. Finally, the donor chamber is immersed in the receiving chamber so that the NaCl solution inside the donor chamber is level with the water inside the receiving chamber. Once the temperature inside the receiving chamber reaches 35° C., conductivity is recorded for 10 minutes. The conductivity versus time data in each of the examples below was substantially linear.

In any of the above-described examples, the contact lens may have a contact angle of less than about 80°, 70°, or 60°, where the contact angle is the dynamic advancing contact angle as determined using a captive bubble method using a DSA 100 prop Shape Analysis System from Krtiss as described in Maldonado-Codina, C. and Morgan, P. B. (2007), *In vitro water wettability of silicone hydrogel contact lenses determined using the sessile drop and captive bubble techniques*. Journal of Biomedical Materials Research Part A, 83A: 496-502.

In any of the above-described examples, the oxygen permeability of the contact lens (Dk) may be at least 55 barrers, or at least 60 barrers. Dk values can be determined using standard methods in the industry, such as by using an Ox-Tran model oxygen transmission rate test system available from Mocon, Inc (Minneapolis, Minn.). The Dk values provided in the Examples below were determined using the method described by Chhabra et al. (2007), *A single-lens polarographic measurement of oxygen permeability (Dk) for hyper-transmissible soft contact lenses*. Biomaterials 28: 4331-4342.

In any of the above described examples, the contact lens may have a tensile modulus (i.e. Young's modulus) of about 0.2 MPa, 0.3 MPa, or 0.4 MPa, to about 0.7 MPa, 0.8 MPa, or 0.9 MPa as measured by an ANSI Z80.20 standard using an Instron Model 3342 or Model 3343 mechanical testing system, or equivalent method. The modulus, elongation, and tensile strength values reported herein were determined using an Instron Model 3342 or 3343 mechanical testing system (Instron Corporation, Norwood, Mass., USA) and Bluehill Materials Testing Software, using a custom built rectangular contact lens cutting die with 4 mm spacing to prepare the rectangular sample strip. The modulus was determined inside a chamber having a relative humidity of least 70%. A lens was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

In any of the above-described examples, the contact lens may have an equilibrium water content (EWC) of greater than about 30 wt. %, 40 wt. % or 50 wt. % and up to about 60 wt. % or 70 wt. %. To measure EWC, excess surface water is wiped off of the lens and the lens is weighed to obtain the hydrated weight. The lens is dried in an oven at 80° C. under a vacuum, and weighed. The weight difference is determined by subtracting the weight of the dry lens from the weight of the hydrated lens. The wt. % EWC of the lens is =(weight difference/hydrated weight)×100. In a specific example, the contact angle is ≤70° and the equilibrium water content is at least about 40 wt. %.

The contact lenses described herein are considered "dimensionally stable" if they are from a batch (i.e. lot) of contact lenses that exhibit an average dimensional stability variance of ≤±3.0% (i.e. less than or equal to plus or minus three percent) as determined by the following method. The chord diameters of twenty lenses from a single lot are measured, and the average "original" diameter is obtained. Concurrently, twenty unopened packages of lenses from the same lot are placed in an incubator set at 55° C. The lenses are kept at this elevated temperature storage condition for three months to approximate a two-year shelf life at 25° C. At the end of three months the packaged lenses are brought to room temperature, removed from their packaging, and measured to obtain the average "final" diameter. The dimensional stability variance is calculated by the equation: (Diameter$_{Final}$–Diameter$_{Original}$/Diameter$_{original}$)×100. In some examples, the dimensional stability variance is ≤±2.5% or ≤±2.0%. In other examples, the lenses have a dimensional stability variance of ≤±3.0% as determined using the above-described method except that the incubator is set at 65° C. This elevated temperature storage condition is considered to approximate a four-year shelf life at 25° C.

In any of the above described examples, the contact lens may have a percent energy loss of about 25, 27, or 30 to about 37, 40, or 45 as determined using a test method in accordance with ANSI Z80.20. The energy loss values reported herein were determined using an Instron Model 3343 (Instron Corporation, Norwood, Mass., USA) mechanical testing system, with a 10N force transducer (Instron model no. 2519-101) and Bluehill Materials Testing Software including a TestProfiler module. Briefly, the energy loss was determined inside a chamber having a relative humidity of least 70%. A lens was soaked in phosphate buffered solution (PBS) for at least 10 minutes prior to testing. Using tweezers, the lens was loaded into the grips of the calibrated Instron apparatus, with the lens loaded vertically between the grips as symmetrically as possible and fitting over at least 75% of the grip surface of each grip. A test designed to determine the energy required to stretch the lens to 100% strain and then return it to 0% strain at a rate of 50 mm/minute was then run on the lens. The test was conducted only once on a single lens. Once the test was finished energy loss was calculated: Lost Energy (%)=(Energy to 100% strain−Energy to return to 0% strain)/Energy to 100% strain×100%.

As is evident from the disclosure of the application as a whole, including the claim structure and the specific examples, the exemplary components of the polymerizable composition disclosed herein are typically combined in embodiments of the invention. For example, the person skilled in the art would recognise that the polymerizable composition of the invention advantageously includes the exemplary mono-functional acrylate-containing siloxane monomers disclosed herein in combination with the exemplary bi-functional acrylate-containing siloxane monomers disclosed herein and/or in combination with the exemplary hydrophilic vinyl-containing monomers disclosed herein and/or in combination with the exemplary vinyl-containing cross-linking agents disclosed herein.

Thus, the mono-functional acrylate-containing siloxane monomers disclosed above are, advantageously, present in the polymerizable compositions of the invention in combination with any of the bi-functional acrylate-containing siloxane monomers disclosed above. For example, the mono-functional acrylate-containing siloxane monomers of formula (I) or formula (III) may optionally be used in combination with any one of the bi-functional acrylate-containing siloxane monomers disclosed above, especially in combination with the bi-functional acrylate-containing siloxane monomers of formula (II) or formula (IV).

Advantageously, the mono-functional acrylate-containing siloxane monomers disclosed above are present in the polymerizable compositions of the invention in combination with any of the hydrophilic vinyl-containing monomers disclosed above. For example, the mono-functional acrylate-containing siloxane monomers of formula (I) or formula (III) may optionally be used in combination with any one of the hydrophilic vinyl-containing monomers disclosed above, especially in combination with VMA, NVP, BVE, EGVE, or DEGVE.

Similarly, the mono-functional acrylate-containing siloxane monomers disclosed above are present in the polymerizable compositions of the invention in combination with any of the vinyl-containing cross-linking agents disclosed above. For example, the mono-functional acrylate-containing siloxane monomers of formula (I) or formula (III) may optionally be used in combination with any one of the vinyl-containing cross-linking agents disclosed above, especially in combination with TEGDVE or DEGDVE.

Similarly, the bi-functional acrylate-containing siloxane monomers disclosed above are, advantageously, present in the polymerizable compositions of the invention in combination with any of the hydrophilic vinyl-containing monomers disclosed above. For example, the bi-functional acrylate-containing siloxane monomers of formula (II) or formula (IV) may optionally be used in combination with any of the hydrophilic vinyl-containing monomers disclosed above, especially in combination with VMA, NVP, BVE, EGVE, or DEGVE.

Similarly, the bi-functional acrylate-containing siloxane monomers disclosed above are, advantageously, present in the polymerizable compositions of the invention in combination with any of the vinyl-containing cross-linking agents disclosed above. For example, the bi-functional acrylate-containing siloxane monomers of formula (II) or formula (IV) may optionally be used in combination with any one of the vinyl-containing cross-linking agents disclosed above, especially in combination with TEGDVE or DEGDVE.

Similarly, the hydrophilic vinyl-containing monomers disclosed above are, advantageously, present in the polymerizable compositions of the invention in combination with any of the vinyl-containing cross-linking agents disclosed above. For example, VMA, NVP, BVE, EGVE, or DEGVE may optionally be used in combination with any of the vinyl-containing cross-linking agents disclosed above, especially in combination with TEGDVE or DEGDVE.

Furthermore, the mono-functional acrylate-containing siloxane monomers disclosed above are, advantageously, present in the polymerizable compositions of the invention in combination with any of the bi-functional acrylate-containing siloxane monomers disclosed above and any of the hydrophilic vinyl-containing monomers disclosed above. Thus, the polymerizable compositions of the invention may optionally include a combination of the mono-functional acrylate-containing siloxane monomers of formula (I) or formula (III), together with both (i) the bi-functional acrylate-containing siloxane monomers of formula (II) or formula (IV), and (ii) a hydrophilic vinyl-containing monomer (such as VMA, NVP, BVE, EGVE, or DEGVE).

Similarly, the mono-functional acrylate-containing siloxane monomers disclosed above are, advantageously, present in the polymerizable compositions of the invention in combination with any of the bi-functional acrylate-containing siloxane monomers disclosed above and any of the vinyl-containing cross-linking agents disclosed above. Thus, the polymerizable compositions of the invention may optionally include a combination of the mono-functional acrylate-containing siloxane monomers of formula (I) or formula (III), together with both (i) the bi-functional acrylate-containing siloxane monomers of formula (II) or formula (IV), and (ii) a vinyl-containing cross-linking agent (such as TEGDVE or DEGDVE).

Similarly, the mono-functional acrylate-containing siloxane monomers disclosed above are, advantageously, present in the polymerizable compositions of the invention in combination with any of the hydrophilic vinyl-containing monomers disclosed above and any of the vinyl-containing cross-linking agents disclosed above. Thus, the polymerizable compositions of the invention may optionally include a combination of the mono-functional acrylate-containing siloxane monomers of formula (I) or formula (III), together with both (i) a hydrophilic vinyl-containing monomer (such as VMA, NVP, BVE, EGVE, or DEGVE) and (ii) a vinyl-containing cross-linking agent (such as TEGDVE or DEGDVE).

Furthermore, the bi-functional acrylate-containing siloxane monomers disclosed above are, advantageously, present in the polymerizable compositions of the invention in combination with any of the hydrophilic vinyl-containing monomers disclosed above and any of the vinyl-containing cross-linking agents disclosed above. Thus, the polymerizable compositions of the invention may optionally include a combination of the bi-functional acrylate-containing siloxane monomers of formula (II) or formula (IV), together with both (i) a hydrophilic vinyl-containing monomer (such as VMA, NVP, BVE, EGVE, or DEGVE) and (ii) a vinyl-containing cross-linking agent (such as TEGDVE or DEGDVE).

Furthermore, the mono-functional acrylate-containing siloxane monomers disclosed above are, advantageously, present in the polymerizable compositions of the invention in combination with any of the bi-functional acrylate-containing siloxane monomers disclosed above, any of the hydrophilic vinyl-containing monomers disclosed above, and any of the vinyl-containing cross-linking agents disclosed above. Thus, the polymerizable compositions of the invention may optionally include a combination of the mono-functional acrylate-containing siloxane monomers of formula (I) or formula (III), together with (i) the bi-functional acrylate-containing siloxane monomers of formula (II) or formula (IV), (ii) a hydrophilic vinyl-containing monomer (such as VMA, NW, BVE, EGVE, or DEGVE), and (iii) a vinyl-containing cross-linking agent (such as TEGDVE or DEGDVE).

As demonstrated by the specific examples, it has been found that a combinations of the preferred mono-functional acrylate-containing siloxane monomers, bi-functional acrylate-containing siloxane monomers, and/or hydrophilic vinyl-containing monomers, and/or vinyl-containing cross-linking agents of the invention provide contact lenses of the invention with advantageous properties.

EXAMPLES

The following Examples illustrate certain aspects and advantages of the present invention, which should be understood not to be limited thereby. Example 1 describes contact lens processing methods, and Examples 2-12 show exemplary polymerizable compositions that were used to make contact lenses using the methods described in Example 1. The polymerizable compositions had good processability resulting in defect- and distortion-free contact lenses. The contact lenses produced were optically clear, meaning that light transmittance between 381 nm to 780 nm was at least 97% (measured in accordance with ISO 18369). Additional physical properties of the lenses are provided in the examples below. Table 1 shows the abbreviation used for each ingredient as well as its molecular weight, which was used to calculate the molar ratios shown in each example. The molar ratios were determined by dividing the unit amount of an ingredient by its molecular weight to obtain the relative molar amount of the ingredient in the polymerizable composition, and comparing that value to the molar amount of another ingredient in the composition. The molar ratios compared are designated A-E in each example as follows: A. hydrophilic vinyl-containing monomer to acrylate-containing siloxane monomer; B. monofunctional acrylate-containing siloxane monomer to bifunctional acrylate-containing siloxane monomer; C. acrylate-containing cross-linking agent to vinyl-containing cross-linking agent; D. acrylate-containing cross-linking agent to bifunctional acrylate-containing siloxane monomer; and E. molar ratios of acrylate-containing monomer and monofunctional acrylate-containing siloxane monomer combined compared to the bifunctional acrylate-containing siloxane monomer. For each polymerizable composition, the relative unit parts, based on weight, are shown. Molar percentages (mol. %) and weight percentages (wt. %) for each reactive ingredient are provided, except that mol. % values of less than 0.01 are not provided. The mol. % and wt. % of a given component are relative to the total moles and weight, respectively, of all reactive components in the composition prior to initiation of curing.

TABLE 1

| Abbreviation | Compound | Molecular Wt |
|---|---|---|
| Si-1 | Formula I above wherein $R^1$ is a butyl group, $R^2$ is hydrogen, $R^3$ is a methyl group, m = 4, and n = 1 | 583 |
| Si-2 | A compound of formula II above wherein $R_1$ and $R_2$ are methyl groups, m is 0, n represents an integer from about 5 to about 10, a represents an integer of from about 70 to about 90, and b represent an integer of from 1 to about 10 | 9,300 |
| Si-3 | Methacryloxypropyl terminated polydimethylsiloxane | 4,500 |
| AE | 2-Allyloxy ethanol | 102 |
| BVE | 4-butanediol vinyl ether | 116 |
| DEGVE | diethylene glycol vinyl ether | 132 |
| EGDMA | ethylene glycol dimethacrylate | 198 |
| EGMA | ethylene glycol methyl ether methacrylate | 144 |
| EGVE | ethylene glycol vinyl ether | 88 |
| HEMA | 2-hydroxyethyl methacrylate | 130 |

TABLE 1-continued

| Abbreviation | Compound | Molecular Wt |
|---|---|---|
| HOB | 2-hydroxybutyl methacrylate | 158 |
| MMA | methyl methacrylate | 100 |
| UV2 | 2-(3-(2H-benzotriazol-2-YL)-4-hydroxy-phenyl)ethyl methacrylate (CAS no. 96478-0-0) | 323 |
| pTPP | Diphenyl (P-vinylphenyl)phosphine (CAS no. 40538-11-2) | 288 |
| RBT1 | 2-Propenoic acid,2-methyl-,1,1'-[(9,10-dihydro-9,10-dioxo-1,4-anthracenediyl)bis(imino-2,1-ethanediyl)]ester (CAS no. 121888-69-5) | |
| RBT2 | 1,4-bis[4-[(2-methacryl-oxyethyl)phenylamino] anthraquinone | |
| TEGDMA | triethylene glycol dimethacrylate | 286 |
| TEGDVE | triethyleneglycol divinyl ether | 202 |
| TPP | Triphenyl phosphine (CAS no. 603-35-0) | |
| V-64 | 2,2'-Azobis-2-methyl propanenitrile | |
| VMA | N-vinyl-N-methylacetamide | 99 |

Example 1

Silicone Hydrogel Contact Lens Fabrication

The chemical compounds listed in the tables in Examples 2-12 were weighed and mixed together to form polymerizable compositions. Each polymerizable composition was filtered using a 0.2-5.0 micron filter and stored for up to about 2 weeks at 2-10° C. prior to cast molding and curing.

The polymerizable composition was cast molded by placing a volume of the composition on a female mold member and fitting a male mold member thereon to form a contact lens mold assembly. The female and male mold members were made from a non-polar resin (e.g. polypropylene). The polymerizable composition was thermally cured to form a polymeric lens body by placing the mold assembly in a nitrogen oven at the following cycle: 30 min. $N_2$ purging at room temperature, 40 min. at 55° or 65° C., 40 min. at 80° C., and 40 min. at 100° C.

After curing, the male and female mold members were dry demolded and the polymeric lens bodies were dry delensed from the male mold members. The delensed lens bodies were then extracted in alcohol, followed by hydration in water (Example 2) or were washed using organic-solvent free extraction (Examples 3-12). For alcohol extraction, lens trays containing the polymeric lens bodies were immersed in ethanol. After a period of time the ethanol was exchanged with fresh ethanol. Then the lens bodies were immersed in a solution of 50:50 ethanol/DI water. After a period of time, the lens bodies were immersed in a two exchanges of DI water. For organic solvent-free extraction, lenses were transferred to individual wells of a washing tray containing DI water and Tween 80 (washing solution). After several minutes, the washing solution was aspirated, and the wells refilled with washing solution; this step was repeated 1-2 times. The extracted and hydrated lenses were placed into blister packages containing a buffered packaging solution, and the packages were sealed and autoclaved.

Example 2

Formulation 1

The polymerizable composition of Formulation 1 shown in Table 2 was used to make contact lenses using the methods described in Example 1, in which alcohol extraction was used. The composition had the following approximate molar ratios: A=9:1, B=48:1, C=5:1, D=2:1, and E=225:1

TABLE 2

| Abbreviation | Unit Amount | Mol. % | Wt. % |
| --- | --- | --- | --- |
| Si-1 | 30 | 6.8 | 26.5 |
| Si-2 | 10 | 0.14 | 8.8 |
| VMA | 48 | 63.9 | 42.3 |
| EGMA | 7 | 6.4 | 6.2 |
| MMA | 15 | 19.8 | 13.2 |
| EGDMA | 0.5 | 0.33 | 0.44 |
| TEGDVE | 0.1 | 0.07 | 0.09 |
| AE | 1.4 | 1.8 | 1.2 |
| V-64 | 0.5 | 0.40 | 0.44 |
| UV2 | 0.9 | 0.37 | 0.79 |
| RBT2 | 0.01 | | 0.01 |
| TPP | 0.5 | | |

Silicon hydrogel contact lenses made from this formulation had acceptable dimensional stability, an oxygen permeability of greater than 60 barrers, an EWC of about 53%, a modulus of about 0.40 MPa, a tensile strength of about 1.4 MPa, a dynamic captive bubble advancing contact angle of about 48 to 52 degrees, a light transmittance of about 98%, wet extractables of about 1.30%, an ionoflux of about $2.9 \times 10^3$ mm$^2$/min, and an energy loss from about 35 to 36%.

Example 3

Formulation 2

The polymerizable composition designated Formulation 2 shown in Table 3 was used to make contact lenses using the methods described in Example 1, in which all liquids used for washing the polymeric lens body were substantially free of volatile organic solvents. The composition had the following approximate molar ratios: A=9:1, B=62:1, C=4:1, D=4:1, and E=231:1

TABLE 3

| Abbreviation | Unit Amount | Mol. % | Wt. % |
| --- | --- | --- | --- |
| Si-1 | 32 | 7.9 | 30.9 |
| Si-3 | 4 | 0.13 | 3.9 |
| VMA | 45 | 64.0 | 43.5 |
| MMA | 13 | 18.6 | 12.6 |
| EGMA | 3 | 3.0 | 2.9 |
| BVE | 3 | 3.7 | 2.9 |
| TEGDMA | 1 | 0.50 | 0.97 |
| TEGDVE | 0.2 | 0.14 | 0.19 |
| pTPP | 0.5 | 0.25 | 0.48 |
| V-64 | 0.5 | 0.43 | 0.48 |
| RBT1 | 0.01 | | 0.01 |
| UV2 | 1.3 | 0.40 | 1.3 |

Silicone hydrogel contact lenses made from this formulation had an EWC of about 57%, a modulus of about 0.70 MPa, an energy loss of about 40%, and a captive bubble dynamic advancing contact angle of from about 50 to about 60 degrees.

Example 4

Formulation 3

The polymerizable composition designated Formulation 3 shown in Table 4 was used to make contact lenses using the methods described in Example 1, in which all liquids used for washing the polymeric lens body were substantially free of volatile organic solvents. The composition had the following approximate molar ratios: A=10:1, B=41:1, C=4:1, D=4:1, and E=185:1.

TABLE 4

| Abbreviation | Unit Amount | Mol. % | Wt. % |
| --- | --- | --- | --- |
| Si-1 | 32 | 7.9 | 30.9 |
| Si-3 | 4 | 0.13 | 3.9 |
| VMA | 45 | 64.0 | 43.5 |
| MMA | 13 | 18.6 | 12.6 |
| EGMA | 3 | 3.0 | 2.9 |
| BVE | 3 | 3.7 | 2.9 |
| TEGDMA | 1 | 0.50 | 0.97 |
| TEGDVE | 0.2 | 0.14 | 0.19 |
| pTPP | 0.5 | 0.25 | 0.48 |
| V-64 | 0.5 | 0.43 | 0.48 |
| RBT1 | 0.01 | | 0.01 |
| UV2 | 1.3 | 0.40 | 1.3 |

Silicone hydrogel contact lenses made from this formulation had an EWC of about 57%, a modulus of about 0.70 MPa, an energy loss of about 40%, and a captive bubble dynamic advancing contact angle of from about 50 to about 60 degrees.

Example 5

Formulation 4

The polymerizable composition designated Formulation 4 shown in Table 5 was used to make contact lenses using the methods described in Example 1, in which all liquids used for washing the polymeric lens body were substantially free of volatile organic solvents. The composition had the following approximate molar ratios: A=10:1, B=41:1, C=4:1, D=4:1, and E=185:1.

TABLE 5

| Abbreviation | Unit Amount | Mol. % | Wt. % |
| --- | --- | --- | --- |
| Si-1 | 26 | 6.6 | 25.1 |
| Si-2 | 10 | 0.16 | 9.6 |
| VMA | 40 | 59.5 | 38.6 |
| MMA | 12 | 17.7 | 11.6 |
| EGMA | 5 | 5.1 | 4.8 |
| BVE | 7 | 8.9 | 6.8 |
| TEGDMA | 1.2 | 0.62 | 1.2 |
| TEGDVE | 0.2 | 0.15 | 0.19 |
| pTPP | 0.5 | 0.28 | 0.48 |
| Vazo64 | 0.5 | 0.45 | 0.48 |
| RB 247 | 0.01 | | 0.01 |
| UV2 | 1.3 | 0.59 | 1.3 |

Silicone hydrogel contact lenses made from this formulation had an EWC of about 56%, a modulus of about 0.50 MPa, and a captive bubble dynamic advancing contact angle of about 47 to about 51 degrees.

Example 6

Formulation 5

The polymerizable composition designated Formulation 5 shown in Table 6 was used to make contact lenses using the methods described in Example 1, in which all liquids used for washing the polymeric lens body were substantially free of volatile organic solvents. The composition had the following approximate molar ratios: A=9:1, B=41:1, C=5:1, D=2:1 and E=185:1.

TABLE 6

| Abbreviation | Unit Amount | Mol. % | Wt. % |
| --- | --- | --- | --- |
| Si-1 | 26 | 7.0 | 26.3 |
| Si-2 | 10 | 0.17 | 10.1 |
| VMA | 40 | 62.9 | 40.4 |
| MMA | 12 | 18.7 | 12.1 |
| EGMA | 5 | 5.4 | 5.1 |
| BVE | 3 | 4.0 | 3.0 |
| EGDMA | 0.5 | 0.39 | 0.51 |
| TEGDVE | 0.1 | 0.08 | 0.10 |
| pTPP | 0.5 | 0.27 | 0.51 |
| V-64 | 0.5 | 0.47 | 1.3 |
| UV2 | 1.3 | 0.63 | 0.01 |
| RBT1 | 0.01 | | 0.51 |

Silicone hydrogel contact lenses made from this formulation had an EWC of about 55%, a modulus of about 0.60 MPa, and a captive bubble dynamic advancing contact angle of from about 47 to about 55 degrees:

Example 7

Formulation 6

The polymerizable composition designated Formulation 6 shown in Table 7 was used to make contact lenses using the methods described in Example 1, in which all liquids used for washing the polymeric lens body were substantially free of volatile organic solvents. The composition had the following approximate molar ratios: A=10:1, B=56:1, C=4:1, D=4:1 and E=221:1.

TABLE 7

| Abbreviation | Unit Amount | Mol. % | Wt. % |
| --- | --- | --- | --- |
| Si-1 | 29 | 7.1 | 28.3 |
| Si-2 | 8 | 0.12 | 7.8 |
| VMA | 44 | 63.3 | 42.9 |
| MMA | 14 | 19.9 | 13.7 |
| EGVE | 5 | 8.1 | 4.9 |
| EGDMA | 0.6 | 0.43 | 0.59 |
| TEGDVE | 0.15 | 0.11 | 0.15 |
| V-64 | 0.5 | 0.43 | 0.49 |
| UV2 | 1.3 | 0.57 | 1.3 |
| RBT1 | 0.01 | | 0.01 |

Silicone hydrogel contact lenses made from this formulation had an EWC of about 56%, and a modulus of about 0.65 MPa.

Example 8

Formulation 7

The polymerizable composition designated Formulation 7 shown in Table 8 was used to make contact lenses using the methods described in Example 1, in which all liquids used for washing the polymeric lens body were substantially free of volatile organic solvents. The composition had the following approximate molar ratios: A=9:1, B=58:1, C=5:1, D=3:1 and E=245:1.

TABLE 8

| Abbreviation | Unit Amount | Mol. % | Wt. % |
| --- | --- | --- | --- |
| Si-1 | 29 | 7.3 | 28.3 |
| Si-2 | 8 | 0.13 | 7.8 |
| VMA | 45 | 66.7 | 43.9 |

TABLE 8-continued

| Abbreviation | Unit Amount | Mol. % | Wt. % |
| --- | --- | --- | --- |
| MMA | 13 | 19.1 | 12.7 |
| HEMA | 4 | 4.5 | 3.9 |
| EGDMA | 0.5 | 0.37 | 0.49 |
| TEGDVE | 0.1 | 0.07 | 0.10 |
| pTPP | 0.5 | 0.25 | 0.49 |
| AE | 0.3 | 0.43 | 1.7 |
| V-64 | 0.5 | 0.45 | 0.01 |
| UV2 | 1.7 | 0.77 | 0.49 |
| RBT1 | 0.01 | | 0.29 |

Silicone hydrogel contact lenses made from this formulation had an EWC of from about 55% to about 56%, a modulus of about 0.53 MPa, a captive bubble dynamic advancing contact angle of from about 51 to about 53 degrees, and an energy loss of about 34%.

Example 9

Formulation 8

The polymerizable composition designated Formulation 8 shown in Table 9 was used to make contact lenses using the methods described in Example 1, in which all liquids used for washing the polymeric lens body were substantially free of volatile organic solvents. The composition had the following approximate molar ratios: A=10:1, B=58:1, C=6:1, D=4:1 and E=199:1.

TABLE 9

| Abbreviation | Unit Amount | Mol. % | Wt. % |
| --- | --- | --- | --- |
| Si-1 | 29 | 7.5 | 27.9 |
| Si-2 | 8 | 0.13 | 7.7 |
| VMA | 42 | 63.6 | 40.5 |
| MMA | 8 | 12.0 | 7.7 |
| EGMA | 6 | 6.3 | 5.8 |
| DEGVE | 7 | 8.0 | 6.7 |
| EGDMA | 0.6 | 0.45 | 0.58 |
| TEGDVE | 0.1 | 0.07 | 0.10 |
| pTPP | 0.5 | 0.26 | 0.48 |
| AE | 0.4 | 0.59 | 0.39 |
| V-64 | 0.5 | 0.46 | 0.48 |
| UV2 | 1.7 | 0.79 | 1.6 |
| RBT1 | 0.01 | | 0.01 |

Silicone hydrogel contact lenses made from this formulation had an EWC of from 57% to 58%, a modulus of about 0.7 MPa, a tensile strength of about 1.5 MPa, a captive bubble dynamic advancing contact angle of from about 44 to about 48 degrees, wet extractables of about 5.1%, an ionoflux of about $2.9 \times 10^{-3}$ mm$^2$/min, and an energy loss from about 32% to about 33%.

Example 10

Formulation 9

The polymerizable composition designated Formulation 9 shown in Table 10 was used to make contact lenses using the methods described in Example 1, in which all liquids used for washing the polymeric lens body were substantially free of volatile organic solvents. The composition had the following approximate molar ratios: A=9:1, B=58:1, C=5:1, D=3:1 and E=190:1.

TABLE 10

| Abbreviation | Unit Amount | Mol. % | Wt. % |
|---|---|---|---|
| Si-1 | 29 | 7.83 | 28.3 |
| Si-2 | 8 | 0.14 | 7.8 |
| VMA | 45 | 71.6 | 43.9 |
| HOB | 7 | 7.0 | 6.8 |
| EGMA | 10 | 10.9 | 9.8 |
| EGDMA | 0.5 | 0.4 | 0.49 |
| TEGDVE | 0.1 | 0.08 | 0.10 |
| pTPP | 0.5 | 0.27 | 0.49 |
| AE | 0.3 | 0.46 | 0.29 |
| V-64 | 0.5 | 0.48 | 0.49 |
| UV2 | 1.7 | 0.83 | 1.7 |
| RBT1 | 0.01 |  | 0.01 |

Silicone hydrogel contact lenses made from this formulation had an EWC of from about 55% to about 56%, a modulus of about 0.6 MPa, a tensile strength of about 1.2 MPa, a captive bubble dynamic advancing contact angle of from about 55 to about 58 degrees, wet extractables of about 4.6%, an ionoflux of about $4.1 \times 10^{-3}$ mm$^2$/min, and an energy loss of from about 31% to about 32%.

Example 11

Formulation 10

The polymerizable composition designated Formulation 10 shown in Table 11 was used to make contact lenses using the methods described in Example 1, in which all liquids used for washing the polymeric lens body were substantially free of volatile organic solvents. The composition had the following approximate molar ratios: A=11:1, B=68:1, C=9:1, D=4:1 and E=230:1.

TABLE 11

| Abbreviation | Unit Amount | Mol. % | Wt. % |
|---|---|---|---|
| Si-1 | 30 | 6.9 | 26.7 |
| Si-2 | 7 | 0.10 | 6.2 |
| VMA | 44 | 59.9 | 39.1 |
| MMA | 8 | 10.8 | 7.1 |
| EGMA | 6 | 5.6 | 5.3 |
| DEGVE | 10 | 10.2 | 8.9 |
| BVE | 4 | 4.6 | 3.6 |
| EGDMA | 0.6 | 0.41 | 0.53 |
| TEGDVE | 0.1 | 0.05 | 0.09 |
| pTPP | 0.5 | 0.26 | 0.44 |
| V-64 | 0.5 | 0.41 | 0.44 |
| RBT1 | 0.01 |  | 0.01 |
| UV2 | 1.8 | 0.75 | 1.6 |

Silicone hydrogel contact lenses made from this formulation had acceptable dimensional stability, an EWC of about 61%, a modulus of about 0.5 MPa, a tensile strength of about 1.2 MPa, a captive bubble dynamic advancing contact angle of from about 45 to about 47 degrees, wet extractables of about 4.55%, an ionoflux of about $3.8 \times 10^{-3}$ mm$^2$/min, and an energy loss of from about 30% to about 33%.

Example 12

Formulation 11

The polymerizable composition designated Formulation 11 shown in Table 12 was used to make contact lenses using the methods described in Example 1, in which all liquids used for washing the polymeric lens body were substantially free of volatile organic solvents. The composition had the following approximate molar ratios: A=10:1, B=68:1, C=5:1, D=7:1 and E=283:1.

TABLE 12

| Abbreviation | Unit Amount | Mol. % | Wt. % |
|---|---|---|---|
| Si-1 | 30 | 7.07 | 27.4 |
| Si-2 | 7 | 0.10 | 6.4 |
| VMA | 45 | 62.5 | 41.1 |
| MMA | 12 | 16.5 | 11.0 |
| EGMA | 6 | 5.7 | 5.5 |
| BVE | 5 | 5.9 | 4.6 |
| TEGDMA | 1.4 | 0.67 | 1.3 |
| TEGDVE | 0.2 | 0.14 | 0.18 |
| pTPP | 0.5 | 0.24 | 0.46 |
| V-64 | 0.5 | 0.42 | 0.46 |
| RBT1 | 0.01 |  | 0.01 |
| UV2 | 1.8 | 0.76 | 1.7 |

Silicone hydrogel contact lenses made from this formulation had acceptable dimensional stability, an EWC of from about 55% to about 57%, a modulus of about 0.7 MPa, a tensile strength of about 1.3 MPa, a captive bubble dynamic advancing contact angle of from about 47 to about 53 degrees, wet extractables of about 4.1%, an ionoflux of about $3.6 \times 10^{-3}$ mm$^2$/min, and an energy loss of from about 34% to about 35%.

Example 13

Formula 12

The polymerizable composition designated Formulation 12 shown in Table 13 was used to make contact lenses using the methods described in Example 1, in which all liquids used for washing the polymeric lens body were substantially free of volatile organic solvents. The composition had the following approximate molar ratios: A=10:1, B=41:1, C=8:1, D=4:1 and E=144:1.

TABLE 13

| Abbreviation | Unit Amount | Mol. % | Wt. % |
|---|---|---|---|
| Si-1 | 25.2 | 7.04 | 25.2 |
| Si-2 | 9.7 | 0.17 | 9.7 |
| VMA | 38.8 | 63.9 | 38.8 |
| BVE | 6.8 | 9.6 | 6.8 |
| EGMA | 4.8 | 5.4 | 4.8 |
| EOEMA | 11.6 | 12.0 | 11.6 |
| TEGDMA | 1.2 | 0.68 | 1.2 |
| TEGDVE | 0.1 | 0.08 | 0.10 |
| V-64 | 0.5 | 0.50 | 0.50 |
| UV2 | 0.9 | 0.45 | 0.9 |
| RBT1 | 0.01 |  | 0.01 |
| pTPP | 0.5 | 0.28 | 0.50 |

Silicone hydrogel contact lenses made from this formulation had an EWC of about 56%, a modulus of about 0.57 MPa, a tensile strength of about 1.90 MPa, wet extractables of about 4.74%, and an energy loss of about 34 to 36%.

Although the disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

A number of publications and patents have been cited hereinabove. Each of the cited publications and patents are hereby incorporated by reference in their entireties.

What is claimed is:

1. A silicone hydrogel contact lens comprising:
a polymeric lens body that is the reaction product of a polymerizable composition comprising
a) at least one mono-functional acrylate-containing siloxane monomer having a molecular weight of less than 2,000;
b) at least one bi-functional acrylate-containing siloxane monomer having a molecular weight of at least 3,000;
c) at least one hydrophilic vinyl-containing monomer; and
d) at least one vinyl-containing cross-linking agent,
wherein the polymerizable composition has a molar ratio of total amount of mono-functional acrylate-containing siloxane monomer to total amount of bi-functional acrylate-containing siloxane monomer of at least 30:1, respectively, and
wherein the silicone hydrogel contact lens provides at least 97% light transmittance between 381 nm to 780 nm as measured in accordance with ISO 18369.

2. The contact lens of claim 1, wherein the mono-functional acrylate-containing siloxane monomer has a molecular weight of less than about 1,000.

3. The contact lens of claim 1, wherein the mono-functional acrylate-containing siloxane monomer is represented by formula (I),

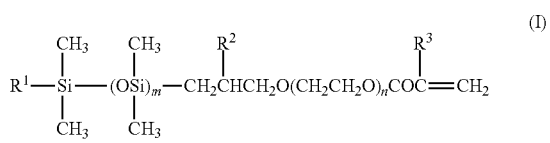

wherein m is an integer from 3 to 10, n is an integer from 0 to 10, $R^1$ is an alkyl group having 1 to 4 carbon atoms, $R^2$ is hydrogen or methyl group, and $R^3$ is hydrogen or a methyl group.

4. The contact lens of claim 1, wherein the bi-functional acrylate-containing siloxane monomer is represented by formula (II),

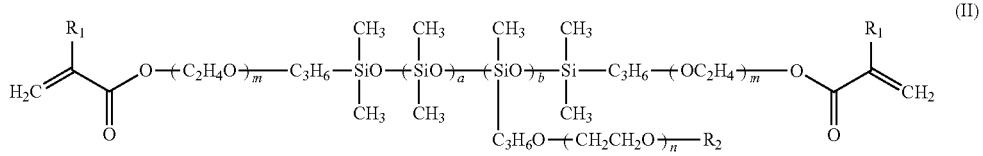

wherein $R_1$ of formula (II) is selected from either hydrogen or a methyl group, $R_2$ of formula (II) is selected from either hydrogen or a $C_{1-4}$ hydrocarbon group, m of formula (II) represents an integer of from 0 to 10; n of formula (II) represents an integer of from 4 to 100, and a and b represent integers of 1 or more.

5. The contact lens of claim 1, wherein the bi-functional acrylate-containing siloxane monomer is a methacryloxypropyl-terminated polydimethylsiloxane.

6. The contact lens of claim 1, wherein the bi-functional acrylate-containing siloxane monomer has a molecular weight of at least 5,000.

7. The contact lens of claim 1, wherein the molar ratio of total amount of mono-functional acrylate-containing siloxane monomer to total amount of bi-functional acrylate-containing siloxane monomer is from about 40:1 to about 200:1.

8. The contact lens of claim 1, wherein the polymerizable composition has a molar ratio of total amount of hydrophilic vinyl-containing monomer to total amount of acrylate-containing siloxane monomer of from about 5:1 to about 20:1.

9. The contact lens of claim 1, wherein the at least one hydrophilic vinyl-containing monomer is selected from N-vinyl-N-methyl acetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof.

10. The contact lens of claim 1, wherein the at least one vinyl-containing cross-linking agent is selected from divinyl ether, or divinyl sulfone, or triallyl phthalate, or triallyl isocyanurate, or diallyl phthalate, or diethyleneglycol divinyl ether, or triethyleneglycol divinyl ether, or any combination thereof.

11. The contact lens of claim 1, wherein the polymerizable composition further comprises at least one non-siloxane acrylate-containing monomer.

12. The contact lens of claim 11, wherein the at least one non-siloxane acrylate-containing monomer is selected from methyl methacrylate (MMA), or 2-hydroxybutyl methacrylate (HOB), or tert butyl methacrylate (tBMA), or N,N-dimethylacrylamide (DMA), or 2-hydroxyethyl methacrylate (HEMA), or ethoxyethyl methacrylamide (EOEMA), or ethylene glycol methyl ether methacrylate (EGMA), or isobornyl methacrylate (IBM), or any combination thereof.

13. The contact lens of claim 11, wherein the polymerizable composition has a molar ratio of total amount of mono-functional acrylate-containing siloxane monomer and total amount of non-siloxane acrylate-containing monomer, combined, to total amount bi-functional acrylate-containing siloxane monomer of at least 100:1, respectively.

14. The contact lens of claim 1, wherein the polymerizable composition further comprises at least one acrylate-containing cross-linking agent.

15. The contact lens of claim 14, wherein the at least one acrylate-containing cross-linking agent is selected from triethylene glycol dimethacrylate, or ethylene glycol dimethacrylate, or a combination thereof.

16. The contact lens of claim 14, wherein the polymerizable composition has a molar ratio of total amount of acrylate-containing cross-linking agent to total amount of bi-functional acrylate-containing siloxane monomer of at least 2:1, respectively.

17. The contact lens of claim 1, wherein the polymerizable composition is substantially free of hydrophilic polymer.

18. The contact lens of claim 1, that is free of post-polymerization surface modification.

19. The contact lens of claim 1, having a wet extractable component of about 2 wt. % to about 8 wt. %.

20. The contact lens of claim 1, characterized by one or more of the following physical characteristics:

a) a dynamic advancing contact angle of ≤70° as determined using a captive bubble method;
b) an oxygen permeability of at least 60 barrers;
c) a tensile modulus from about 0.2 MPa to about 0.9 MPa;
d) an equilibrium water content from about 30% wt/wt to about 70% wt/wt;
e) an ionoflux of less than $6 \times 10^{-3}$ mm$^2$/min; and
f) an energy loss from about 27 to about 45%.

21. A method of manufacturing the silicone hydrogel contact lens of claim 1, comprising:
   a) polymerizing the polymerizable composition to form the polymeric lens body;
   b) washing the polymeric lens body with a washing liquid to remove unreacted or partially reacted components from the polymeric lens body;
   c) sealing the washed polymeric lens body in a package comprising a packaging solution; and
   d) sterilizing the sealed package.

22. The method of claim 21, wherein the washing liquid and any other liquid used for washing the polymeric lens body are substantially free of volatile organic solvents.

23. The method of claim 21, wherein the method does not comprise surface treating the polymeric lens body with plasma.

24. The method of claim 21, wherein the method does not comprise coating the washed polymeric lens body with a hydrophilic polymer or adding a hydrophilic polymer to the packaging solution.

* * * * *